United States Patent

Pakusch et al.

[11] Patent Number: 5,807,609
[45] Date of Patent: Sep. 15, 1998

[54] MINERAL BUILDING MATERIALS MODIFIED WITH POLYMERS AND CONTAINING AT LEAST ONE ADDED COMPOUND

[75] Inventors: Joachim Pakusch, Ludwigshafen; Maximillian Angel, Schifferstadt; Andree Dragon, Speyer; Wilhelm Friedrich Beckerle, Bobenheim-Roxheim; Helmut Teichmann, Bad Dürkheim, all of Germany

[73] Assignee: BASF Aktiengesellschaft, Ludwigshafen, Germany

[21] Appl. No.: 506,731

[22] Filed: Jul. 26, 1995

[30] Foreign Application Priority Data

Jul. 29, 1994 [DE] Germany ............... 44 26 873.4

[51] Int. Cl.$^6$ ............................................. B05D 5/00
[52] U.S. Cl. ............... 427/244; 427/393.5; 427/397.8; 524/4; 524/5; 524/8; 524/375; 524/755; 524/761; 524/762
[58] Field of Search .................... 524/4, 5, 375, 524/761, 755, 8, 762; 427/244, 393.5, 397.8

[56] References Cited

U.S. PATENT DOCUMENTS

| | | | |
|---|---|---|---|
| 3,043,790 | 7/1962 | Sanders et al. | 524/8 |
| 3,196,122 | 7/1965 | Evans et al. | 427/140 |
| 3,232,899 | 2/1966 | Guziak | 524/562 |
| 3,239,479 | 3/1966 | Roenicke et al. | 524/8 |
| 4,125,504 | 11/1978 | Mani et al. | 524/5 |
| 4,131,585 | 12/1978 | Feigin | 524/375 X |
| 4,225,496 | 9/1980 | Columbus et al. | 524/425 |
| 4,340,510 | 7/1982 | Howanietz et al. | 524/5 |
| 4,929,648 | 5/1990 | Armbruster et al. | 524/375 X |
| 5,010,124 | 4/1991 | Olsson et al. | 524/375 X |
| 5,109,042 | 4/1992 | Stephens | 524/375 X |

FOREIGN PATENT DOCUMENTS

| | | |
|---|---|---|
| 845499 | 12/1976 | Belgium . |
| 0 242 646 | 10/1987 | European Pat. Off. . |
| 0 537 411 | 4/1993 | European Pat. Off. . |
| 0 573 036 | 12/1993 | European Pat. Off. . |
| 32 20 384 | 12/1983 | Germany . |
| 28 37 898 | 5/1987 | Germany . |
| 43 17 035 | 11/1994 | Germany . |
| 43 17 036 | 11/1994 | Germany . |
| 43 20 220 | 12/1994 | Germany . |
| 0010942 | 4/1970 | Japan ............ 524/755 |
| 0028889 | 7/1974 | Japan ............ 524/375 |
| 54-43285 | 4/1979 | Japan . |
| 0067664 | 4/1982 | Japan ............ 524/375 |
| 1 505 558 | 3/1978 | United Kingdom . |

OTHER PUBLICATIONS

Derwent Abstracts, AN–91–210625/29, JP–3–131533, Jun. 5, 1991.
Technische Information der BASF AG, TI/ED 1118 d, Jul. 1991, "Acronal 290 D", 4 pages.
Technische Information der BASF AG, TI/ED 1036 d, Nov. 1990, "Acronal S 702", 4 pages.

*Primary Examiner*—Judy M. Reddick
*Attorney, Agent, or Firm*—Oblon, Spivak, McClelland, Maier & Neustadt, P.C.

[57] ABSTRACT

At least one compound

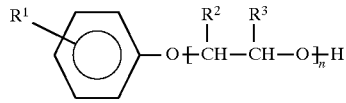

is added to mineral building materials modified with polymers in order to increase their adhesive power on foams based on polystyrene.

17 Claims, No Drawings

MINERAL BUILDING MATERIALS MODIFIED WITH POLYMERS AND CONTAINING AT LEAST ONE ADDED COMPOUND

The present invention relates to mineral building materials modified with polymers and containing at least one added compound of the general formula I

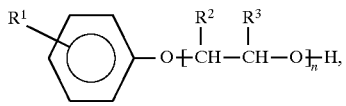

where
$R^1$ is $C_1-C_5$-alkyl, preferably methyl,
$R^2$ and $R^3$ are each hydrogen or methyl, with the proviso that $R^2$ must differ from $R^3$, and
n is from 2 to 9, preferably from 4 to 7, particularly preferably 6.

Mineral binders are generally known. They are pulverulent inorganic substances, such as lime, gypsum and/or in particular cement, which are converted into their ready-to-use form by stirring with water, said form solidifying to a stone-like material as a function of time when left to itself, in the air or under water. They are usually used for the preparation of mineral building materials, such as mortars or concretes, by adding finely divided or coarser additives, such as sand or stones, during mixing with water.

It is furthermore generally known that mineral building materials are frequently used in a form modified with polymers (the term polymer is intended here to include those high molecular weight compounds which are obtainable by free radical polymerization of starting monomers having at least one ethylenically unsaturated group), for selectively controlling the property profile of said building materials. Suitable modifying polymers are polymers having a very wide range of monomer compositions and whose glass transition temperature Tg may vary within a wide range, for example from −60° to +180° C. Examples of the modification of mineral building materials with polymers include, for example, U.S. Pat. No. 4,340,510, British Patent 1,505,558, U.S. Pat. No. 3,196,122, U.S. Pat. No. 3,043,790, U.S. Pat. No. 3,239,479, DE-A 43 17 035, DE-A 43 17 036, DE-A 43 20 220, EP-A 537 411, German Published Application DAS 16 69 903, BE-A 84 54 499, JP-A 54/43285, U.S. Pat. No. 4,225,496, DE-A 32 20 384, DE-A 28 37 898, U.S. Pat. No. 3,232,899 and JP-A 91/131533.

It is also generally known that foams based on polystyrene (e.g. Styropor® or Styrodur®) are increasingly being incorporated during the erection of new buildings (in particular in Europe).

For example, tile elements comprising Styrodur form an excellent support material for laying ceramic wall tiles by the thin-bed method. Furthermore, Styrodur construction elements are suitable for interrupting thermal bridges as occur, for example, where concrete and masonry meet one another. It is also known that Styropor panels can be applied to facades for heat insulation. The conventional method consists in fixing the back of the Styropor insulating panels to the facade (for example comprising masonry, concrete, mineral render, etc) by means of cement mortar modified with polymers. As a rule, the same mortar is applied as a reinforcing filler to the front of the Styropor insulating panels. Said filler is usually used for embedding fabric reinforcements (for example comprising glass fiber, polyester, polypropylene, etc), which as a rule are employed for bridging vertical joints between the individual Styropor panels. Finally, reinforcing filler is again applied over the lattice fabric, usually for completely embedding the fabric, the surface leveled and, after setting, a final coat, for example a mineral or synthetic resin render, is applied.

According to the above, the problem of producing a permanent bond between foams based on polystyrene and mineral building materials modified with polymers is very generally arising to an increasing extent. In particular, this adhesion should also be satisfactory under the action of moisture.

The disadvantage of the known polymer-modified mineral building materials is that their adhesion to foams based on polystyrene is unsatisfactory after they have set.

It is an object of the present invention to provide polymer-modified mineral building materials which, after they have set, have in particular high wet adhesion to foams based on polystyrene.

We have found that this object is achieved by the mineral building materials defined at the outset. The compounds of the general formula I are generally known. For example, compounds of the general formula I are recommended in the Technical Information of BASF AG TI/ED 1118d, July 1991 (Acronal® 290 D) and in the Technical Information of BASF AG TI/ED 1036d, November 1990 (Acronal® S 702), in order to have an advantageous effect on the film formation of aqueous polymer emulsions.

A particularly preferably used novel compound I is one in which $R^1$ is methyl and n is 6. The methyl radical $R^1$ is advantageously ortho and/or para to the ether group. The amount of compound of the general formula I added according to the invention is usually from 0.1 to 20 and preferably from 0.1 to 10, % by weight, based on the modified polymer present in the mineral building material.

The effect of improving the adhesion to polystyrene foams occurs in particular when the polymer used for modifying the mineral building material is one which, in polymerized form, is composed of from 90 to 100% by weight of at least one monomer selected from the group consisting of styrene, α-methylstyrene, vinyltoluenes and esters of α,β-monoethylenically unsaturated carboxylic acids of 3 to 6 carbon atoms and alkanols of 1 to 12 carbon atoms (monomers a) and from 0 to 10% by weight of other monomers having at least one ethylenically unsaturated group (monomers b).

Preferred monomers a are n-butyl acrylate and styrene. Suitable monomers b include nitriles of α,β-monoethylenically unsaturated carboxylic acids of 3 to 6 carbon atoms, their amides, which may be substituted at N, and the unsaturated carboxylic acids themselves, as well as monomers such as acrylamidepropanesulfonic acid, vinylpyrrolidone, hydroxyethyl acrylate or quaternary vinylimidazole. The modifying polymer preferably contains not more than 5% by weight of monomers b as polymerized units.

The polymer modifying the mineral building material is particularly advantageously one which, in polymerized form, is composed of from 30 to 70% by weight of at least one ester of α,β-monoethylenically unsaturated carboxylic acids of 3 to 6 carbon atoms and alkanols of 1 to 12 carbon atoms (monomers a'), from 30 to 70% by weight of at least one monomer selected from the group consisting of styrene, α-methylstyrene and vinyltoluenes (monomers b') and from 0 to 5% by weight of one or more monomers selected from the group consisting of α,β-monoethylenically unsaturated carboxylic acids of 3 to 6 carbon atoms and amides thereof (monomers c').

A preferred monomer a' is n-butyl acrylate and preferred monomer b' is styrene.

The amounts by weight of the various monomers incorporated as polymerized units in the polymer modifying the mineral building material are advantageously chosen so that, according to the Fox equation, a glass transition temperature of from −15° to +60° C., particularly preferably from 0° to 40° C., results, said amounts being based on a total amount of polymerized monomers.

According to Fox (T. G. Fox, Bull. Am. Phys. Soc. (Ser. II) 1, [1956], 123), the following is a good approximation for the glass transition temperature of copolymers:

$$\frac{1}{Tg} = \frac{X^1}{Tg^1} + \frac{X^2}{Tg^2} + \ldots \frac{X^n}{Tg^n},$$

where $X^1$, $X^2$, ..., $X^n$ are the mass fractions of the monomers 1, 2, ..., n and $Tg^1$, $Tg^2$, ... $Tg^n$ are the glass transition temperatures, in degrees Kelvin, of the polymers composed in each case only of one of the monomers 1, 2, ..., n. The glass transition temperatures of these homopolymers of the abovementioned monomers are known and are described, for example, in J. Brandrup, E. H. Immergut, Polymer Handbook 1st Edition, J. Wiley, New York 1966, 2nd Edition, J. Wiley, New York 1975, and 3rd Edition, J. Wiley, New York, 1989.

Other suitable polymers modifying the mineral building material are of course those which contain, as polymerized units, mainly esters of vinyl alcohol and carboxylic acids of up to 6 carbon atoms, e.g. vinyl acetate or vinyl propionate. A particularly suitable comonomer here is ethylene.

Usually, the polymers modifying the mineral building material are introduced in the form of their aqueous polymer emulsions, and the modifying polymers are therefore preferably prepared by the free radical aqueous emulsion polymerization method.

The advantages of this procedure include the fact that the aqueous polymer emulsion on the one hand contains the polymers in particularly finely divided form implying binding activity and on the other hand has, as a dispersing medium, the water in any case required for mixing. The weight average diameter $\bar{d}_w$ of the dispersed polymer particles is preferably >100 nm, very particularly preferably >300 nm. Usually, $\bar{d}_w$ is ≦2,000 nm. It is also advantageous if the diameters of the disperse polymer particles are distributed over a wide diameter range.

A suitable measure for characterizing the width of the diameter distribution is the quotient $Q=d_{90}-d_{10}/d_{50}$, where $d_{10}$ is the diameter which is not exceeded by m% by weight of the disperse polymer particles. Q is preferably from 0.5 to 1.5.

The manner in which aqueous polymer emulsions having such a particle distribution width are obtained is known to a person skilled in the art (for example from DE-A 43 07 683).

The free radical aqueous emulsion polymerization may be carried out either in the presence of dispersants, for example protective colloids and/or emulsifiers, or in the absence of these. The semi batch procedure is advantageously used for free radical aqueous emulsion polymerization, i.e. the predominant amount of the monomers is fed continuously into the polymerization vessel at a rate corresponding to the conversion in the polymerization (feed process). If emulsifiers are present, up to 3% by weight, based on the monomers to be polymerized, usually being used, the monomers to be polymerized are as a rule fed in together, preemulsified in an aqueous medium.

The novel compounds I are advantageously incorporated directly into the aqueous polymer emulsion which contains the polymer to be used for modifying the building material. The novel compound I may be added before, during or after the end of the free radical aqueous emulsion polymerization. The novel compound I is advantageously added in the feed process either after the end of the free radical aqueous emulsion polymerization or together with the monomers to be introduced.

An application form of the polymer modifying the mineral building material which is even more advantageous than the aqueous polymer emulsion is that comprising the polymer powder which is redispersible in an aqueous medium, since salable storable dry formulations which need only be stirred with water for conversion into the ready-to-use form can be prepared from said polymer powder with the other mortar, concrete or render components.

A particularly advantageous method for converting an aqueous polymer emulsion into a redispersible polymer powder is the spray drying method, in which the aqueous polymer emulsion is sprayed in a warm air stream and is dewatered. The drying air and the sprayed aqueous polymer emulsion are preferably fed cocurrent through the dryer (cf. for example EP-A 262 326 or EP-A 407 889).

According to the invention, it is advantageous that, in the presence of the conventional sprayer systems and anticaking agents, it is also possible satisfactorily to spray-dry aqueous polymer emulsions which contain the novel compound I to give the polymer powders in which the novel compound I is already incorporated and which is redispersible in an aqueous medium. Suitable sprayer systems and anticaking agents are, for example, those which are described in EP-A 78 449, EP-A 407 889, EP-A 294 663 DE-A 26 29 924 and German Published Application DAS 2,614,261. Examples are naphthalenesulfonic acid/formaldehyde and phenolsulfonic acid/formaldehyde condensates, as well as the high molecular weight compounds of DE-A 43 20 220 (O.Z. 0050/44088) and finely divided silicas. The spray-drying of the aqueous polymer emulsions containing the novel compound I and, if required, the spray assistants is particularly advantageously carried out by spraying said emulsions in a warm air stream by means of a one-material or multimaterial nozzle or a rotating disk. The inlet temperature of the warm air stream is usually from 100° to 200° C., preferably from 120° to 160° C., and the outlet temperature is usually from 40° to 100° C. The polymer powders can be deposited in the conventional manner, in particular with the use of cyclones or filter separators. Other methods, for example freeze-drying, may of course also be used for obtaining polymer powder.

With regard to the free radical polymerization initiators, dispersants and, if required, molecular weight regulators to be concomitantly used for the preparation of the aqueous polymer emulsion comprising the modifying polymer, there are essentially no restrictions according to the invention.

The novel action is particularly advantageous when mineral binders comprises from 70 to 100% by weight of cement and from 0 to 30% by weight of gypsum are used. Their use, according to the invention, in mineral building materials which are based exclusively on cement as the mineral binder proves to be very particularly advantageous.

The novel action is substantially independent of the type of cement. Thus, blast furnace slag cement, oil shale cement, Portland cement, hydrophobic Portland cement, quick-setting cement, high-expansion cement or high-alumina cement may be employed, depending on the intended application, the use of Portland cement proving particularly advantageous.

Typically, the dry compositions of mineral building materials contain from 0.1 to 20% by weight of modifying polymer. It is noteworthy that the compounds I to be added according to the invention impart greater adhesive power to the novel mineral building materials, essentially without impairing the other properties of the mineral building material.

This is due to the fact that the increased adhesive power of the novel mineral building materials on foam materials based on polystyrene presumably arises because the novel compounds I are capable of superficially dissolving expanded polystyrene to a certain extent without significantly damaging the foam material. This dissolved polystyrene presumably interacts with the polymers used for modifying the building material and thus increases the adhesive power. This also explains the permanent increased adhesion in the presence of water. Of course, the novel building materials may also be applied to other materials, such as wood, plastic, mineral wool or other mineral materials, such as masonry and concrete.

Since their mineral characteristics do of course enable them to adhere to other mineral materials, they are very particularly advantageous for the application of foam materials based on polystyrene to mineral materials.

Particularly suitable in this respect are mineral building materials whose composition comprises:

from 20 to 60, preferably from 20 to 50, % by weight of mineral binder (preferably exclusively cement), from 0.1 to 10, preferably from 0.1 to 5, % by weight of modifying polymer, from 0.1 to 20, preferably from 0.1 to 10, % by weight, based on the modifying polymer, of a compound I, from 0 to 25% by weight, based on the mineral binder, of conventional assistants (for example antifoams or thickeners) and as the residual amount, additives, such as sand, fillers (e.g. $CaCO_3$) and/or pigments ($TiO_2$).

Finally, it should be stated that the compounds I may also be incorporated in dry formulations of mineral building materials which formulations contain modifying polymer and have not yet been mixed, if the compounds I, which are usually liquid at standard temperature and pressure, are applied (absorbed and/or adsorbed) on a filler or sand as a carrier, and the resulting dry product is incorporated. They can thus also be introduced into dry formulations of building adhesives or of plastic renders. Possible carriers for the novel compounds I are in particular finely divided chalks as well as finely divided silica.

EXAMPLES

EXAMPLE 1

Preparation of emulsions of polymers suitable for modifying mineral building materials, which emulsions contain a compound I, and polymer powder obtainable from these emulsions and redispersible in an aqueous medium.

D1: 1.04 g of ethoxylated p-isooctylphenol (degree of ethoxylation 25) and 0.16 g of the sodium salt of an ethoxylated and subsequently sulfated p-isooctylphenol (degree of ethoxlation 25), as emulsifiers, were added to a solution of 0.63 g of polyacrylamide (protective colloid), 0.37 g of formic acid and 1.57 g of sodium bicarbonate (pH standardizing agent) in 131.5 g of water, and the mixture was heated to 90° C. Thereafter, an emulsion of 271.5 g of n-butyl acrylte, 234.9 g of styrene, 10.4 g of acrylamide, 5.2 g of methacrylamide, 21.6 g of propoxylated m-/p-cresol mixture (degree of propoxylation 6) as compound I, 1.57 g of an ethoxylated p-isooctylphenol (degree of ethoxylation 25) and 3.76 g of the sodium salt of an ethoxylated and subsequently sulfated p-isooctylphenol (degree of ethoxylation 25) in 144.6 g of water, in the course of 2 hours, and (beginning simultaneously with the feed described above), in the course of 2.5 hours, a solution of 3.03 g of sodium peroxodisulfate in 120 g of water were added continuously to a polymerization vessel containing this mixture, while maintaining a temperature of 90° C.

Stirring was then continued for a further 2 hours at 90° C., the mixture was finally cooled to 60° C. After the addition of a solution of 1.04 g of tert-butyl hydroperoxide in 9.4 g of water, a solution of 1.04 g of sodium formaldehyde sulfoxylate in 4.2 g of water was added continuously at this temperature in the course of 1 hour, and stirring was then continued for a further 0.5 hour at 60° C. After cooling to 25° C., neutralization was effected with a suspension of 0.5 g of calcium hydroxide in 1.9 g of water. Filtration gave an aqueous polymer emulsion having a solids content of 55.2% by weight, a light transmittance, based on a solids content of 0.01% by weight (layer thickness 2.5 cm, temperature 20° C.) of 10% (based on pure water) and a pH of 8.5.

D2: As for D1, except that the 21.6 g of compound I was added only after the neutralization step with calcium hydroxide. Filtration gave an aqueous polymer emulsion having a solids content of 54.9% by weight, a light transmittance, based on a solids content of 0.01% by weight (layer thickness 2.5 cm, temperature 20° C.), of 10% (based on pure water) and a pH of 8.5.

VD1: VD1 is a comparative emulsion. It was prepared in the same was as D1, but without the addition of the novel compound I. Filtration gave an aqueous polymer emulsion having a solids content of 55.3% by weight, a light transmittance, based on a solids content of 0.01% by weight (layer thickness 2.5 cm, temperature 20° C.) of 8% (based on pure water) and a pH of 8.5.

D3: As for D1, except that the addition of 21.6 g of compound I was carried out not in the emulsion feed but in the initially taken mixture itself. Filtration gave an aqueous polymer emulsion having a solids content of 55.1% by weight, a light transmittance, based on a solids content of 0.01% by weight (layer thickness 2.5 cm, temperature 20° C.), of 13% (based on pure water), and a pH of 8.5.

P1, P2, VP1, P3:

The aqueous polymer emulsions described above were mixed with 10% by weight (solid/solid) of the naphthalenesulfonic acid/ formaldehyde condensate according to Example 4 of EP-A 78 449 (not as a sodium salt but as a calcium salt) and were diluted to a total solids content of 35% by weight by adding water. Thereafter, drying was effected in a laboratory dryer of the Minor type from Niro having a capacity of 2 kg/h under the conditions stated in Table 1 below to give polymer powders which were completely satisfactorily redispersible in an aqueous dispersing medium. The atomizing element was a two-material nozzle having a hole of 0.8 mm.

TABLE 1

| Emulsion | Powder | Inlet temperature of the drying air (°C.) | Outlet temperature of the drying air (°C.) | Wall deposit | Powder yield |
|---|---|---|---|---|---|
| D1 | P1 | 130 | 61 | little | 90 |
| D2 | P2 | 130 | 61 | little | 86 |
| VD1 | VP1 | 130 | 61 | little | 90 |

TABLE 1-continued

| Emulsion | Powder | Inlet temperature of the drying air (°C.) | Outlet temperature of the drying air (°C.) | Wall deposit | Powder yield |
|---|---|---|---|---|---|
| D3 | P3 | 130 | 60 | little | 91 |

EXAMPLE 2

Use of the polymer powders P1, P2, VP1 and P3 in reinforcing mortars for heat-insulating Styropor composite systems.

A dry blend was prepared according to the following formulation:

370 g of Omyacarb® 130 Gu (white calcium carbonate from Omya GmbH, Cologne),
140 g of quartz sand,
430 g of cement PZ 35 F,
18 g of finely divided silica (Microsilica from Elkem GmbH, Allensbach),
30 g of polymer powder,
10 g of Lumiten® E-P 3108 (antifoam from BASF AG) and
2 g of Walocel® MT 20 000 PV (methylhydroxyethylcellulose, slowly soluble in cold water at neutral pH, thickener, from Wolff Walsrode AG).

The dry blend was stirred with water in a weight ratio of 100:20 (water) by means of a stirrer (mixer according to DIN 1164) for 2 minutes and then applied to commercial, 5 cm thick Styropor panels of the type PS 15 SE (designation according to Güteschutzgemeinschaft Hartschaum e.V., Frankfurt) (wet layer thickness of 3 mm). The Styropor panels coated in this manner were stored (dry) for 14 days at 25° C. After the end of the storage, circles of 5 cm diameter (core drilling) were drilled in the coated Styropor panels, the depth of drilling extending 10 mm into the Styropor. Some of the drilled Styropor panels were then stored for a further day in water at 25° C. The adhesion of the drill cores comprising reinforcing mortar on the Styropor panel was then tested in the tear-off test. The results are shown in Tables 2 and 3.

TABLE 2

Exclusively dry storage

| Polymer powder | Fracture pattern | Adhesive strength [N/mm²] |
|---|---|---|
| P1 | 100% loss of cohesion in the Styropor | 0.32* |
| P2 | 100% loss of cohesion in the Styropor | 0.33* |
| VP1 | 100% loss of adhesion between mortar and Styropor | 0.20 |
| P3 | 100% loss of cohesion in the Styropor | 0.32* |

The % are based on the fracture surface.
*corresponds to the inherent strength of the Styropor.

TABLE 3

Dry storage and wet storage

| Polymer powder | Fracture pattern | Adhesive strength [N/mm²] |
|---|---|---|
| P1 | 80% loss of cohesion in the Styropor | 0,30 |
| P2 | 90% loss of cohesion in the Styropor | 0,35 |
| VP1 | 100% loss of adhesion between mortar and Styropor | 0,19 |
| P3 | 70% loss of cohesion in the Styropor | 0,30 |

The % are based on the fracture surface.

We claim:

1. A mineral building material, comprising a mineral binder, a polymer and at least one added compound of the formula I:

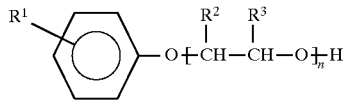

where:
  $R^1$: is $C_1$–$C_5$-alkyl,
  $R^2$ and $R^3$ are each hydrogen or methyl, with the proviso that $R^2$ is different from $R^3$, and
  n: is from 2 to 9,
  wherein the polymer is formed by polymerizing one or more monomers having at least one ethylenically unsaturated group.

2. A mineral building material as claimed in claim 1, which contains at least one added compound of the formula I where $R^1$ is methyl.

3. A mineral building material as claimed in claim 1, which contains at least one added compound of the formula I where n is from 4 to 7.

4. A mineral building material as claimed in claim 1, which contains at least one added compound of the formula I where n is 6.

5. A mineral building material as claimed in claim 1, which contains cement as a mineral binder.

6. A mineral building material as claimed in claim 1, which contains cement as a sole mineral binder.

7. A mineral building material as claimed in claim 1, which contains, as the polymer, one whose glass transition temperature is from −60° to +180° C.

8. A mineral building material as claimed in claim 1, which contains, as the polymer, one whose glass transition temperature is from −15° to +60° C.

9. A mineral building material as claimed in claim 1, which contains, as the polymer, one whose glass transition temperature is from 0° to 40° C.

10. A mineral building material as claimed in claim 1, wherein the polymer, in polymerized form, is composed of
  a) from 90 to 100% by weight of at least one monomer selected from the group consisting of styrene, α-methylstyrene, vinyltoluenes and esters of α,β-monoethylenically unsaturated carboxylic acids of 3 to 6 carbon atoms and alkanols of 1 to 12 carbon atoms, and
  b) from 0 to 10% by weight of other monomers having at least one ethylenically unsaturated group.

11. A mineral building material as claimed in claim 1, which contains, as the polymer, one which, in polymerized form, is composed of from 30 to 70% by weight of at least one ester of α,β-monoethylenically unsaturated carboxylic acids of 3 to 6 carbon atoms and alkanols of 1 to 12 carbon atoms, from 30 to 70% by weight of at least one monomer selected from the group consisting of styrene, α-methylstyrene, vinyltoluenes and from 0 to 5% by weight of one or more monomers selected from the group consisting of α,β-monoethylenically unsaturated carboxylic acids of 3 to 6 carbon atoms and amides thereof.

12. A mineral binding building material as claimed in claim 1, which contains, as the polymer, one which, in polymerized form, is composed of from 90 to 100% by weight of n-butyl acrylate or styrene and from 0 to 10% by weight of other monomers having at least one ethylenically unsaturated group.

13. A mineral binding building material as claimed in claim 1, which contains, as the polymer, one which, in polymerized form, is composed of from 30 to 70% by weight of n-butyl acrylate, from 30 to 70% by weight of styrene and from 0 to 5% by weight of one or more monomers selected from the group consisting of α,β-monoethylenically unsaturated carboxylic acids of 3 to 6 carbon atoms and amides thereof.

14. A mineral building material as claimed in claim 1, whose dry composition contains from 0.1 to 20% by weight of polymer.

15. A mineral building material as claimed in claim 1, whose dry composition comprises from 20 to 60% by weight of mineral binder, from 0.1 to 10% by weight of polymer, from 0.1 to 20% by weight, based on the polymer, of at least one compound I, from 0 to 25% by weight, based on the mineral binder, of conventional assistants and, as the residual amount, additives.

16. A method for preparing building materials, comprising the step of applying a mineral building material as claimed in claim 1 to foam materials based on polystyrene.

17. A method of producing a mineral building material, comprising adding the compound of formula I:

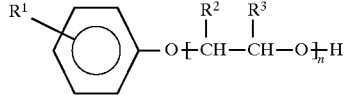

where $R^1$: $C_1$–$C_5$-alkyl, $R^2$ and $R^3$ are each hydrogen or methyl, with the proviso that $R^3$ is different from $R^3$, and n: is from 2 to 9 to mineral building materials comprising a mineral binder and a polymer formed by polymerizing one or more monomers having at least one ethylenically unsaturated group.

* * * * *

UNITED STATES PATENT AND TRADEMARK OFFICE
CERTIFICATE OF CORRECTION

PATENT NO. : 5,807,609
DATED : September 15, 1998
INVENTOR(S) : Joachim PAKUSCH, et al.

It is certified that error appears in the above-identified patent and that said Letters Patent is hereby corrected as shown below:

On the title page, Item [75], the second inventor's name should be:

--Maximilian Angel--

Signed and Sealed this

Eleventh Day of May, 1999

Attest:

Q. TODD DICKINSON

*Attesting Officer*     *Acting Commissioner of Patents and Trademarks*